United States Patent [19]

Machacek

[11] Patent Number: 5,191,267
[45] Date of Patent: Mar. 2, 1993

[54] SYSTEM FOR INDICATING EXTENT OF OVERDRIVE IN FRICTIONAL DRIVE ARRANGEMENTS

[76] Inventor: David G. Machacek, 513 Union St., Northfield, Minn. 55057

[21] Appl. No.: 837,899

[22] Filed: Feb. 20, 1992

[51] Int. Cl.$^5$ .................... H02P 5/46; B65G 21/18; F25D 25/04
[52] U.S. Cl. .................................... 318/67; 318/77; 198/778; 198/952; 62/381
[58] Field of Search .............. 62/381, 380, 266, 63, 62/62; 198/952, 841, 788, 778, 544; 318/6, 7, 52, 53, 67, 68, 69, 70, 77, 432, 433

[56] References Cited

U.S. PATENT DOCUMENTS

| | | | |
|---|---|---|---|
| 4,126,817 | 11/1978 | Luzio | 318/7 |
| 4,363,457 | 12/1982 | Flint et al. | 318/7 X |
| 4,513,229 | 4/1985 | Kudelski | 318/7 |

Primary Examiner—Bentsu Ro
Attorney, Agent, or Firm—Haugen and Nikolai

[57] ABSTRACT

A spiral drum freezer apparatus having a system for measuring and monitoring the "overdrive" of a rotated drum relative to a spiral belt helically wrapped around the drum in an ascending fashion. The system measures overdrive directly and continuously by obtaining a first speed measurement of the drum directly from the sprockets of a drive gear box drivingly engaging the drum. An alternative point of measurement for measuring rotational speed includes proximate the sprockets of a drum wheel driven by a belt, or sensing spaced-apart vertical outer structure members of the drum. Another point yet is on a disc-like plate. This plate is coaxially aligned and attached to the drum, and has precisionally spaced apart markings proximate a periphery where the rotational speed of the plate is directly proportional to the rotational speed of the drum. A second speed measurement is obtained by measuring the rotational speed of sprockets of a guide roller guiding the spiral belt. The second speed measurement can also be obtained by sensing evenly spaced markings on the spiral belt. A moving window averaging scheme is used to obtain a reliable and accurate measurement of the speed of the drum and the guideroller. A processor calculates overdrive and generates a readout continuously of the overdrive as a function of the first and second speed measurements.

21 Claims, 2 Drawing Sheets

SYSTEM FOR INDICATING EXTENT OF OVERDRIVE IN FRICTIONAL DRIVE ARRANGEMENTS

BACKGROUND OF THE INVENTION

I. Field of the Invention

The present invention relates generally to a spiral drum freezer apparatus rotatably mounted within an insulated enclosure for continuously freezing food articles. More particularly, the invention relates to a system directly measuring and indicating the extent of overdrive of a spiral belt frictionally engaging a periphery of the spiral drum.

II. Description of the Prior Art

Lotension spiral drive systems typically comprise an endless conveyor belt tightly arranged about a drum in an axially ascending or descending path. These spiral drive systems are typically used to route a large quantity of food packages through a freezer providing a chilling or even a cryogenic environment for rapidly freezing the food packages destined for use in other commercial markets, consumer markets, or both markets.

In a typical spiral drive system, an endless conveyor belt is guided in a helical path by support rails that progress either up or down the drum. The conveyor belt is disposed perpendicular to the drum surface and contacts the drum surface on an inner edge. The driving force on the conveyor belt results from the frictional engagement of the inner belt edge and the drum surface, similar in fashion to a rope in a capstan winch which is driven by a frictional force between the rope and the drum.

The amount of slippage between the belt and the drum is very important to the proper operation of a spiral conveyor. Too little slippage results in high conveyor belt tensions, while too much slippage results in high wear and pulsation phenomena in the conveyor belt. Therefore, an accurate determination and continual monitoring of the slippage parameter, called "overdrive", is very important.

In the past, the only way to determine the overdrive parameter was to measure it directly. For instance, one would stand at the outside conveyor belt edge of a running spiral and place an article on the conveyor belt. At that moment, the same radial spot on the drum surface is noted or marked. The drum is allowed to rotate one complete revolution, and when the spot marked on the drum surface passes the observer, the radial distance between this mark and the article riding on the belt is measured. Overdrive is defined as the distance that the drum leads the conveyor belt in one revolution of the drum, measured at the outside edge of the conveyor belt. This direct method of measurement has several disadvantages, including the possibility of inaccurate measurement in dark and cramped quarters, and the necessity of one being subject to the harsh processing atmosphere of a spiral conveyor, often exceeding $-40°$ F. Further, there was no way to continuously monitor overdrive, rather, overdrive was only sampled periodically.

U.S. Pat. No. 4,866,354 teaches a method of controlling the relative slippage or overdrive to set the overdrive at an acceptable value, but fails to teach a method of actually calculating overdrive other than by visually observing. Further, the speed of a gear motor driving the drum is obtained by means of a tachometer, which provides a voltage output to a summation circuit having a potentiometer in a feedback control circuit. Hence, the tachometer output is only indicative of motor speed which is not always indicative of the actual speed of drum rotation or overdrive. For instance, elements situated between the drive motor and the drum can fail, such as a safety clutch or a drive belt, producing conditions where the tachometer would not sense the true speed of a drum slowing down, having a disastrous effect on the wear of the spiral belt. Further, typical freezers see operating temperatures as low as $-40°$ F. or more and daily wash-downs with 160° F. water containing detergents and sanitizers. The freeze/thaw cycle can cause condensation to form within parts of the tachometers such that pressure differentials can cause water to literally be sucked into any cracks of the speed measuring device. Therefore, tachometers are undesirable because they are unreliable in such a harsh environment.

OBJECTS

It is a primary object of the present invention to provide a spiral freezer apparatus having a means to reliably measure overdrive accurately, quickly, and which is easily calibratable.

It is a further object of the present invention to provide a means for measuring overdrive directly and continuously such that failures of critical components disposed between a sensor and the drum, such as clutch assemblies and drive belts, will not lead to false or inaccurate overdrive measurements.

It is a further object of the invention to provide a means for measuring overdrive implementing a measuring scheme which generates sufficiently accurate readings.

Other and further objects of the present invention will become apparent to those skilled in the art upon a study of the following specification, appended claims, and accompanying drawings.

SUMMARY OF THE INVENTION

The foregoing features and the objects of the invention are achieved by providing a spiral drum freezer apparatus capable of automatically determining overdrive wherein speed sensing means are directly coupled to driving mechanisms driving the spiral drum and the spiral belt. The spiral drum freeze apparatus comprises a spiral drum mounted for rotation within an insulated enclosure including a spiral belt helically wrapped around an outer surface of the spiral drum. A drum gear motor drives a spiral drum via a first driving mechanism to rotate the drum. A take-up drive gear motor drives the spiral belt via a second driving mechanism wherein a plurality of rotatable guides guide the spiral belt to and from the spiral drum. A first speed sensor is coupled to the first driving mechanism and generates a first output indicative of the rotational speed of the spiral drum. A second speed sensor is coupled to the second driving mechanism and generates a second output indicative of spiral belt speed. A processor computes overdrive as a function of the first output relative to the second output. In this fashion, overdrive is calculated directly from the crucial parts, namely, the spiral drum and the continuous spiral belt. By avoiding measurements of components which are unreliably indicative of the speed of the drum or spiral belt, false or inaccurate overdrive readings due to failures or errors are avoided.

Preferably, the first speed sensor is coupled directly to sprockets of a drive gear forming a portion of a drive gear box interfaced between the drum gear motor and a drive belt, and the second speed sensor is coupled to sprockets of one rotatable guide coupled to the spiral belt.

A further improvement of the invention includes implementing a moving window averaging scheme responsive to the sensed sprockets of the drive gear box and the sensed sprockets of the rotatable guide. This moving window averaging scheme averages the measured times between consecutively sensed sprockets to provide a more accurate reading by averaging out variations in distances between the sprockets. Further, the number of sprockets sensed to generate an average reading indicative of speed is adjustable to optimize the accuracy and quickness of a reading. Because the sprockets of the driving gear ar readily accessible and relatively uniform in spacing, and the driving gear has a small diameter having a short period of rotation relative to the drum, an accurate reading can be obtained by proximity sensors in a relatively short period of time. The measuring apparatus is accurate, inexpensive, and easy to calibrate.

In an alternative embodiment of the invention the first speed sensor can be directly coupled to a disc having markings precisely spaced apart. This disc is coaxially affixed to the drum having a diameter substantially less than the diameter of the drum. Time between sensed markings is measured to obtain angular speed of the disc which is directly proportional to angular speed of the drum.

In yet another alternative embodiment of the invention, the first speed sensor can be coupled to sprockets of the drum. However, since the drum sprockets have a relatively large diameter, speed of the measurement is slower.

In yet another alternative embodiment of the invention, the first speed sensor can be coupled to uniformly spaced markings on the surface of the drum, such as support members or other uniformly spaced markings.

In yet another alternative embodiment of the invention, the first speed sensor can be coupled to uniformly spaced links of a drive chain coupling the drive gear box to the drum.

In yet another alternative embodiment of the invention, the second speed sensor can be coupled to the spiral belt to sense uniformly spaced markings such as apertures or recesses.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1:
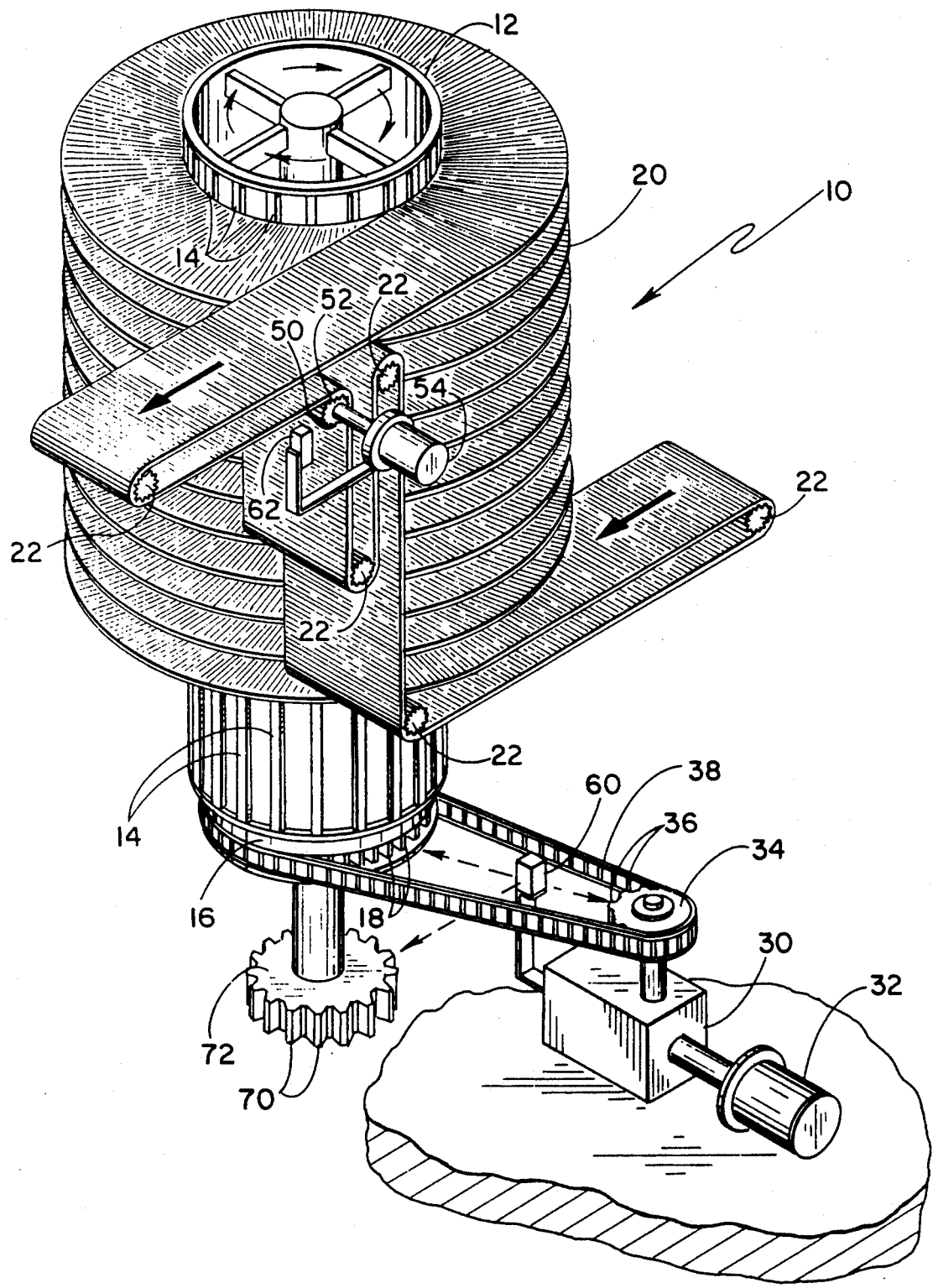
FIG. 1 is a perspective view of a spiral drum freezer wherein the spiral drum is rotated by a spiral drum gear motor via a gear box and the belt, and proximity sensors are implemented to determine overdrive according to the invention.

In accordance with the preferred embodiment of the present invention, and with particular attention to FIG. 1, a Lotension mechanical spiral drive system of the present invention, generally designated 10, includes a cylindrical drum 12 defined by multiple longitudinal support members 14 each extending the length of drum 12. Drum 12 includes an integral coaxial wheel 16 having a predetermined number of tertiary sprockets 18 generally uniformly spaced around a lower periphery thereof. Spiral belt 20 is helically wound about a periphery of drum 12 and supported and guided by several support arms (not shown), and is guided by several rotating guide rollers 22 in and out of an insulated enclosure (not shown). Drive gearbox 30 mechanically and rotatably couples energy from drive gear motor 32 to secondary circular gear 34 having a predetermined number of uniformly spaced secondary sprockets 36 defined about a periphery thereof. Drive chain or belt 38 forming a portion of the driving mechanism drivingly couples rotational energy of motor 32 from sprockets 36 to sprockets 18 of drum 12. Therefore, when drive gear motor 32 is operated, drive belt 38 drivingly rotates drum 12 which, in turn, rotates frictionally engaging spiral belt 20 disposed thereabout. Gear 34 has a diameter substantially less than both the diameter of drum 12 and wheel 16 such that the period of rotation of gear 34 is substantially less than the period of rotation of drum 12 and wheel 16. Driving guideroller 50 guiding spiral belt 20 has a predetermined number of sprockets 52 uniformly spaced about a periphery engaging spiral belt 20 and is mechanically coupled to takeup motor 54 for drivingly rotating spiral belt 20.

A predetermined number of support arms (not shown) are axially and radially spaced throughout system 10 and securingly attached to uniformly spaced frame members 14, such as by welding, providing maximum inter-flight dimensional openings or spacings between adjacent flights comprising the spiral path of spiral belt 20. U.S. Pat. No. 4,893,708 owned by the applicant is incorporated by reference herein to illustrate other intricate details of a typical spiral belt system.

A first proximity sensor 60 is located closely proximate uniformly spaced sprockets 36 of circular drive gear 34 for sensing sprockets 36 and providing a corresponding pulsed output representative of the number of sensed sprockets 36. The number of sensed sprockets 36 per a unit time period is indicative of rotational speed of drive gear 34 which is directly proportional to rotational speed of spiral drum 12 as they are directly coupled to one another via non-elastic drive belt 38. A second proximity sensor 62 is located closely proximate guideroller 50 and senses uniformly spaced sprockets 52, which guideroller rotational speed is directly proportional to mechanically coupled spiral belt 20. Sensor 62 provides a corresponding pulsed output representative of the number of sensed sprockets 52, similar to sensor 60. Proximity sensors 60 and 62 preferably comprise an analog device with no pulse-shaping circuitry in the sensor itself. Each sensor 60 and 60 provides a low-impedance signal offering the advantages of low electrical noise suppression. A "TURCK-NAMUR" inductive sensor having an oscillating circuit with an output varying in amplitude relative to proximate metal objects such as sprockets has found a wide application in hazardous environments and is preferable in the preferred embodiment. These sensors contain a relatively small number of components helping to assure a high degree of reliability.

Figure 2:
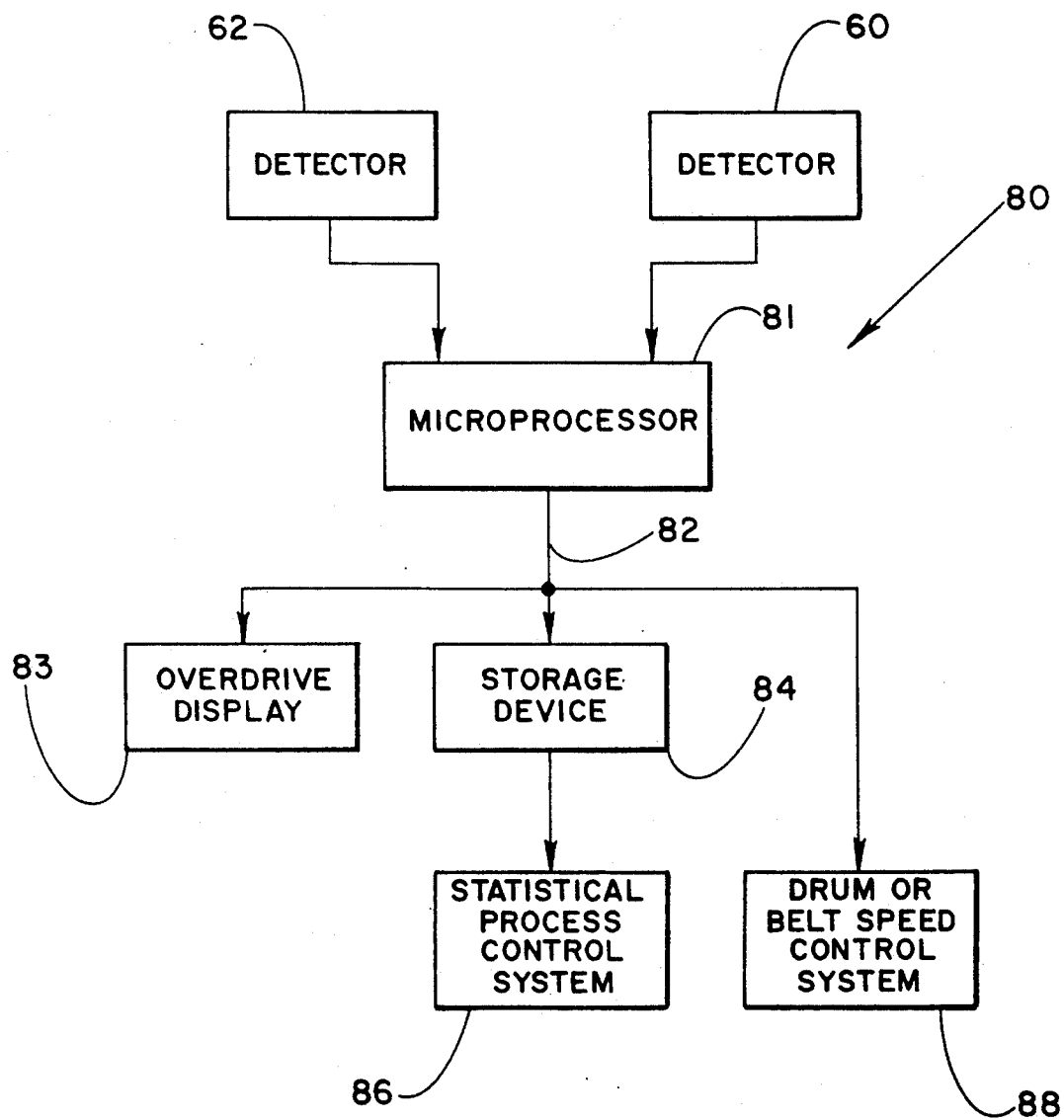
FIG. 2 is a block diagram of a circuit for determining overdrive.

Referring to FIG. 2, a block diagram of a standard microprocessor based circuit is generally shown at 80 interfacing with sensors 60 and 62. To measure actual overdrive, a microprocessor 81 first measures time periods $P_{DRUM}$ and $P_{BELT}$ between successive pulses received from and generated by sensors 60 and 62, respectively, and subsequently executes the following mathematical equation 1:

$$\text{OVERDRIVE} = 2\pi \sqrt{R_{OUTSIDE}^2 + H_{TIER}^2} \left[1 - \left(\frac{N_{DRUM}}{N_{BELT}}\right)\left(\frac{R_{BELT}}{R_{OUTSIDE}}\right)\left(\frac{P_{DRUM}}{P_{BELT}}\right)c\right] \quad \text{Equation 1}$$

where $R_{OUTSIDE}$ is the radius measured from the center of drum 12 to the outside edge of belt 20.

$H_{TIER}$ is the height between adjacent tiers of spiral belt 20.

$N_{DRUM}$ is the number of pulses detected by sensor 60 during one revolution of drum 12.

$N_{BELT}$ is the number of pulses detected by sensor 62 in one revolution of associated guideroller 50.

$R_{BELT}$ is the radius from the center of roller 50 to the point of the belt pitch distance.

$P_{DRUM}$ is the time period between any two successive pulses of sensor 60.

$P_{BELT}$ is the time period between any two successive pulses of sensor 62.

As various components wear over time such that physical parameters change, such as the spiral belt stretching or the sprockets wearing, a calibration constant "c" which is close to unity may be necessary.

More accurate measurements of overdrive are obtained by implementing a moving window averaging scheme which creates meaningful results with every measured pulse. The window size is "the number of time periods (readings) averaged" to obtain $P_{DRUM}$ and $P_{BELT}$ for use in equation 1. The window size is selectively chosen (or moving) to substantially reduce errors due to non-uniform distances between sprockets on drive gear 34 and drive roller 50. For instance, on a gear 34 having thirteen sprockets, the time measurements between nineteen successive pulses averaged, or about every 1.5 rotations, has been found to produce excellent rotational speed measurements. The effective accuracies of rotational speed measurements obtained from non-precisely spaced sprockets has been substantially improved when this moving window averaging scheme is implemented.

The calculated overdrive is output from microprocessor 81 and routed via bus 82 to display 83, such as a CRT monitor, stored in a storage device 84, such as memory, and subsequently used by a statistical process control system 86 to process overdrive as a function of time, as well as other variables and factors. The calculated overdrive parameter can also be routed via bus 82 to a control system 88 controlling motor speeds which can compare and control actual overdrive as a function of a predetermined overdrive set point programmed into microprocessor 81. Measured overdrive can also be easily accessed during calibration procedures.

By visually displaying overdrive on display 83, such as a visual numeric display, operators of the spiral drive system are more cognizant of the overdrive parameter.

The overdrive values can be manually or automatically put on conventional run-charts, x-bar, and R-charts, which can be indicators of long-term slow changes or short-term component failures deleterious to the operation of the conveyor.

Referring back to FIG. 1, alternative locations desirable for sensor 60 to sense uniformly spaced markings indicative of rotational speed of drum 12 include closely proximate markings 70 precisionally and uniformly spaced near a periphery of circular disc or circular plate 72. Plate 72 is coaxially and securingly affixed and extending from a bottom surface of wheel 16, but could also be attached coaxially above drum 12. Sensor 60 senses sprockets 70 in a similar fashion as discussed for sprockets 36 to provide an output indicative of angular rotational speed of drum 12. Plate 72 has the same period of rotation as drum 12, where angular speed of circular plate 72 is directly proportional to angular rotational speed of drum 12. Because markings 70 are precisionally spaced, few measured time periods between sensed markings 70 are needed for averaging to obtain a highly accurate and quick speed measurement, hence, a small window is used.

Another alternative location for sensor 60 includes closely proximate uniformly spaced sprockets 18 on planetary wheel drive 16. Wheel 16 has the same period of rotation as drum 12, hence, knowing the diameters of both drum 12 and wheel 16, rotational speed of drum 12 can be determined by determining rotational speed of wheel 16. However, sprockets 18 are not necessarily precisely spaced and drum 12 is not rotating as fast as drive gear 34, hence, the time period to obtain a reliable rotational speed using the moving window averaging scheme is longer.

Yet another location for placing sensor 60 is proximate uniformly spaced longitudinal support members 14 whereupon proximity sensor 60 senses support members 14. Again, a substantially longer period of time is required with a sufficient window to establish an accurate rotational speed of drum 12, and support members 14 are not necessarily as uniform in spacing as desired. Yet another location for placing sensor 60 includes proximate drive chain 38 sensing evenly spaced links.

An alternative location for sensor 62 is proximate either major surface of spiral belt 20. Sensor 62 can sense uniformly spaced markings located on the surface of spiral belt 20, such as apertures or recesses receiving sprockets 52, perforations, or structural members, but limitation to these markings is not to be inferred.

Various combinations of the discussed locations of sensors 60 and 62 can be implemented to obtain the two outputs required to calculate overdrive. Various space, cost, etc. limitations would be taken into account to influence a selected combination of locations.

In summary, by directly sensing drum 12 and spiral belt 20 using highly accurate proximity sensors 60 and 62, "overdrive" can be precisely and automatically calculated using equation 1. Since sensors 60 and 62 are sensing components generating outputs which are accurately and reliably indicative of rotational speed of spiral drum 12 and spiral belt 20, a more accurate overdrive reading is calculable in a convenient manner wherein chances for error and false readings are substantially reduced. Overdrive is calculated continuously and numerically displayed, and can be electronically monitored and recorded remotely. Further, it is ideal for integration with control systems and statistical process systems.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Spiral drum freezer apparatus, comprising:
   (a) an insulated enclosure;
   (b) a spiral drum mounted for rotation within said enclosure and including a spiral belt helically disposed around a periphery;
   (c) a drum gear motor;
   (d) first drive means drivingly engaged between said drum gear motor and said spiral drum for rotating said spiral drum;
   (e) second drive means coupled to said spiral belt for driving said spiral belt, including a plurality of rotating guide means guiding said spiral belt;
   (f) first speed sensing means coupled to said first drive means for generating a first output indicative of spiral drum rotational speed;
   (g) second speed sensing means coupled to said second drive means for generating a second output indicative of spiral belt speed; and
   (h) processing means for computing overdrive as a function of said first output and said second output.

2. The spiral drum freezer apparatus as specified in claim 1 wherein said first drive means includes a drive gear box and a drive belt wherein said drive gear box is coupled to said drum gear motor and drivingly engaging said drive belt, and said drive belt is coupled to said spiral drum.

3. The spiral drum freezer apparatus as specified in claim 2 wherein said drive gear box includes a first plurality of sprockets engaging said drive belt.

4. The spiral drum freezer apparatus as specified in claim 3 wherein said rotating guide means includes a second plurality of sprockets engaging said spiral belt and said second speed sensing means sense said second plurality of sprockets.

5. The spiral drum freezer apparatus as specified in claim 4 wherein said first and second speed sensing means each comprise a proximity sensor.

6. The spiral drum freezer apparatus as specified in claim 4 wherein said processing means includes a moving window averaging scheme, averaging time periods measured between sensed said first and second plurality of sprockets to calculate said overdrive.

7. Spiral drum freezer apparatus, comprising:
   (a) an insulated enclosure;
   (b) a spiral drum having an outer surface and mounted for rotation within said enclosure and including a spiral belt helically disposed around said outer surface;
   (c) first drive means coupled to said spiral drum for rotating said spiral drum;
   (d) second drive means coupled to said spiral belt for driving said spiral belt, including a plurality of rotating guide means guiding said spiral belt;
   (e) first speed sensing means sensing said drum outer surface for generating a first output indicative of spiral drum rotational speed;
   (f) second speed sensing means coupled to said second drive means for generating a second output indicative of spiral belt speed; and
   (g) processing means for computing overdrive as a function of said first output and said second output.

8. The spiral drum freezer apparatus as specified in claim 7 wherein said outer surface of said spiral drum includes a first plurality of sprockets and said first speed sensing means senses said first plurality of sprockets.

9. The spiral drum freezer apparatus as specified in claim 7 wherein said outer surface of said spiral drum includes a plurality of axially aligned and generally uniformly spaced frame members and said first speed sensing means senses said frame members.

10. The spiral drum freezer apparatus as specified in claim 8 wherein said rotating guide means includes a second plurality of sprockets and said second speed sensing means senses said second plurality of sprockets.

11. The spiral drum freezer apparatus as specified in claim 10 wherein said processing means includes a moving window averaging scheme, averaging time periods measured between sensed said first and second plurality of sprockets to calculate overdrive.

12. Spiral drum freezer apparatus, comprising:
    (a) an insulated enclosure;
    (b) a spiral drum mounted for rotation within said enclosure and including a spiral belt helically disposed therearound;
    (c) first drive means coupled to said spiral drum for rotating said spiral drum;
    (d) second drive means coupled to said spiral belt for driving said spiral belt, including a plurality of rotating guide means guiding said spiral belt;
    (e) a sensing member having a generally circular periphery and coaxially aligned and coupled to said spiral drum having a plurality of precisionally spaced markings disposed proximate said periphery;
    (f) a first speed sensing means sensing said precisionally spaced markings for generating a first output indicative of spiral drum rotational speed;
    (g) second speed sensing means coupled to said second drive means for generating a second output indicative of spiral belt speed; and
    (h) processing means for computing overdrive as a function of said first and second outputs and generating a third output indicative of computed overdrive.

13. The spiral drum freezer apparatus as specified in claim 12 wherein said sensing member has a diameter substantially less than a diameter of said spiral drum.

14. The spiral drum freezer apparatus as specified in claim 13 wherein said precisionally spaced markings comprise a plurality of extruding fingers.

15. The spiral drum freezer apparatus as specified in claim 13, wherein said precisionally spaced markings comprise a plurality of recesses.

16. The spiral drum freezer apparatus as specified in claim 13, wherein said sensing member comprises a plate-like disc.

17. The spiral drum freezer apparatus as specified in claim 12 wherein said processing means includes a moving window averaging scheme, averaging time periods measured between sensed said precisionally spaced markings to calculate overdrive.

18. Spiral drum freezer apparatus, comprising:
(a) an insulated enclosure;
(b) a spiral drum mounted for rotation within said enclosure and including a spiral belt helically disposed around a periphery;
(c) a drum gear motor;
(d) first drive means drivingly engaged between said drum gear motor and said spiral drum for rotating said spiral drum;
(e) second drive means coupled to said spiral belt for driving said spiral belt, including a plurality of rotating guide means guiding said spiral belt;
(f) first speed sensing means coupled to said first drive means for generating a first output indicative of spiral drum rotational speed;
(g) second speed sensing means coupled to said spiral belt for generating a second output indicative of spiral belt speed; and
(h) processing means for computing overdrive as a function of said first output and said second output.

19. The spiral drum freezer apparatus as specified in claim 18 wherein said spiral belt includes a first plurality of evenly spaced markings and said second speed sensing means senses said first plurality of spaced markings.

20. Spiral drum freezer apparatus, comprising:
(a) an insulated enclosure;
(b) a spiral drum having an outer surface and mounted for rotation within said enclosure and including a spiral belt helically disposed around said outer surface;
(c) first drive means coupled to said spiral drum for rotating said spiral drum;
(d) second drive means coupled to said spiral belt for driving said spiral belt, including a plurality of rotating guide means guiding said spiral belt;
(e) first speed sensing means sensing said drum outer surface for generating a first output indicative of spiral drum rotational speed;
(f) second speed sensing means coupled to said spiral belt for generating a second output indicative of spiral belt speed; and
(g) processing means for computing overdrive as a function of said first output and said second output.

21. Spiral drum freezer apparatus, comprising:
(a) an insulated enclosure;
(b) a spiral drum mounted for rotation within said enclosure and including a spiral belt helically disposed therearound;
(c) first drive means coupled to said spiral drum for rotating said spiral drum;
(d) second drive means coupled to said spiral belt for driving said spiral belt, including a plurality of rotating guide means guiding said spiral belt;
(e) a sensing member having a generally circular periphery and coaxially aligned and coupled to said spiral drum having a plurality of precisionally spaced markings disposed proximate said periphery;
(f) a first speed sensing means sensing said precisionally spaced markings for generating a first output indicative of spiral drum rotational speed;
(g) second speed sensing means coupled to said spiral belt for generating a second output indicative of spiral belt speed; and
(h) processing means for computing overdrive as a function of said first and second outputs and generating a third output indicative of computed overdrive.

* * * * *